US010446133B2

(12) United States Patent
Yanagisawa et al.

(10) Patent No.: US 10,446,133 B2
(45) Date of Patent: Oct. 15, 2019

(54) MULTI-STREAM SPECTRAL REPRESENTATION FOR STATISTICAL PARAMETRIC SPEECH SYNTHESIS

(71) Applicant: Kabushiki Kaisha Toshiba, Minato-ku (JP)

(72) Inventors: Kayoko Yanagisawa, Cambridge (GB); Ranniery Maia, Cambridge (GB); Yannis Stylianou, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 248 days.

(21) Appl. No.: 15/441,547

(22) Filed: Feb. 24, 2017

(65) Prior Publication Data

US 2017/0263239 A1 Sep. 14, 2017

(30) Foreign Application Priority Data

Mar. 14, 2016 (GB) .................................. 1604334.1

(51) Int. Cl.
*G01L 13/00* (2006.01)
*G10L 13/047* (2013.01)
*G10L 13/08* (2013.01)

(52) U.S. Cl.
CPC ............ *G10L 13/047* (2013.01); *G10L 13/08* (2013.01)

(58) Field of Classification Search
CPC ....................................................... G10L 13/00
USPC .... 704/500, 265, 262, 246, 236, 233, 200.1; 705/44; 726/26; 709/223
See application file for complete search history.

(56) References Cited

U.S. PATENT DOCUMENTS

| | | | | |
|---|---|---|---|---|
| 5,926,791 A * | 7/1999 | Ogata | H04N 19/63 375/240.11 |
| 10,225,365 B1 * | 3/2019 | Hotchkies | H04L 67/327 |
| 2002/0055838 A1 * | 5/2002 | Mueller | G10L 13/10 704/236 |
| 2003/0182104 A1 * | 9/2003 | Muesch | G10L 21/0364 704/200.1 |
| 2008/0106370 A1 * | 5/2008 | Perez | G10L 17/00 340/5.7 |
| 2008/0177532 A1 * | 7/2008 | Greiss | G10L 21/038 704/200.1 |

(Continued)

FOREIGN PATENT DOCUMENTS

JP 2000-194388 A 7/2000

OTHER PUBLICATIONS

Tadashi Inai, et al., "Sub-Band Text-to-Speech Combining Sample-Based Spectrum with Statistically Generated Spectrum" Interspeech, Sep. 2015, pp. 264-268.

(Continued)

*Primary Examiner* — Michael C Colucci
(74) *Attorney, Agent, or Firm* — Oblon, McClelland, Maier & Neustadt, L.L.P.

(57) ABSTRACT

There is provided a speech synthesizer comprising a processor configured to receive one or more linguistic units, convert said one or more linguistic units into a sequence of speech vectors for synthesizing speech, and output the sequence of speech vectors. Said conversion comprises modelling higher and lower spectral frequencies of the speech data as separate high and low spectral streams by applying a first set of one or more statistical models to the higher spectral frequencies and a second set of one or more statistical models to the lower spectral frequencies.

14 Claims, 11 Drawing Sheets

(56) References Cited

U.S. PATENT DOCUMENTS

| | | | | |
|---|---|---|---|---|
| 2009/0076814 | A1* | 3/2009 | Lee | G10L 25/78 704/233 |
| 2009/0112580 | A1 | 4/2009 | Hirabayashi et al. | |
| 2010/0086108 | A1* | 4/2010 | Jaiswal | G10L 17/005 379/88.04 |
| 2010/0250723 | A1* | 9/2010 | Kamei | H04L 12/185 709/223 |
| 2011/0239306 | A1* | 9/2011 | Avni | G06F 21/54 726/26 |
| 2012/0173238 | A1* | 7/2012 | Mickelsen | G10L 15/30 704/246 |
| 2012/0265534 | A1* | 10/2012 | Coorman | G10L 13/033 704/265 |
| 2012/0284026 | A1* | 11/2012 | Cardillo | G10L 17/08 704/246 |
| 2013/0096917 | A1* | 4/2013 | Edgar | G10L 15/00 704/246 |
| 2014/0214676 | A1* | 7/2014 | Bukai | G06Q 20/12 705/44 |
| 2015/0366504 | A1* | 12/2015 | Connor | A61B 5/6804 600/301 |
| 2016/0026253 | A1* | 1/2016 | Bradski | G02B 27/225 345/8 |
| 2016/0027430 | A1* | 1/2016 | Dachiraju | G10L 13/027 704/262 |
| 2017/0169815 | A1* | 6/2017 | Zhan | G10L 15/075 |

OTHER PUBLICATIONS

Zhengqi Wen, et al., "Amplitude Spectrum based Excitation Model for HMM-based Speech Synthesis", http://speakit.cn/Group/file/Amplitude%20Spectrum%20based%20Excitation%20Model%20for%20HMM-based%20Speech%20Synthesis.pdf, Jan. 2012, 4 pages.

Wolfgang Reichl, et al., "Robust Decision Tree State Tying for Continuous Speech Recognition" IEEE Transactions on Speech and Audio Processing, vol. 8, No. 5, Sep. 2000, pp. 555-566.

Ian Vince McLoughlin, "A review of line spectral pairs" School of Computer Engineering, Nanyang Technological University, Sep. 4, 2007, 34 pages.

Yao Qian, et al., "On the Training Aspects of Deep Neural Network (DNN) for Parametric TTS Synthesis", 2014 IEEE International Conference on Acoustic, Speech and Signal Processing (ICASSP), 2014, 5 pages.

Heiga Zen, et al., "Statistical Parametric Speech Synthesis Using Deep Neural Networks", Acoustics, Speech and Signal Processing (ICASSP), 2013, 5 pages.

H.J. Nock, et al. , "A Comparative Study of Methods for Phonetic Decision-Tree State Clustering", Cambridge University Engineering Department, 1997, 4 pages.

Alexandros Potamianos, et al "Stream Weight Computation for Multi-Stream Classifiers" , Proc. of Intl. Conf. Acoustic, Speech and Signal Proc., May 2006, 4 pages.

United Kingdom Search Report dated Aug. 1, 2016 in GB application 1604334.1, filed on Mar. 14, 2016.

* cited by examiner

MULTI-STREAM SPECTRAL REPRESENTATION FOR STATISTICAL PARAMETRIC SPEECH SYNTHESIS

FIELD

Embodiments described herein relate generally to a system and method of speech processing and a system and method of training a model for a text-to-speech system.

BACKGROUND

Text to speech systems are systems where audio speech or audio speech files are output in response to reception of a text file.

Text to speech systems are used in a wide variety of applications such as electronic games, e-book readers, e-mail readers, satellite navigation, automated telephone systems and automated warning systems.

In statistical parametric speech synthesis, such as Hidden Markov Model (HMM) based synthesis, one of the problems is in the over-smoothing of parameters, which leads to a muffled sensation in the synthesised output.

There is a continuing need to make efficient systems which sound more like a human voice.

BRIEF DESCRIPTION OF THE FIGURES

Systems and methods in accordance with non-limiting embodiments will now be described with reference to the accompanying figures in which:

FIG. 3(*b*) shows clustering (mapping) for streams for a system with two spectral streams;

DETAILED DESCRIPTION

Figure 1:
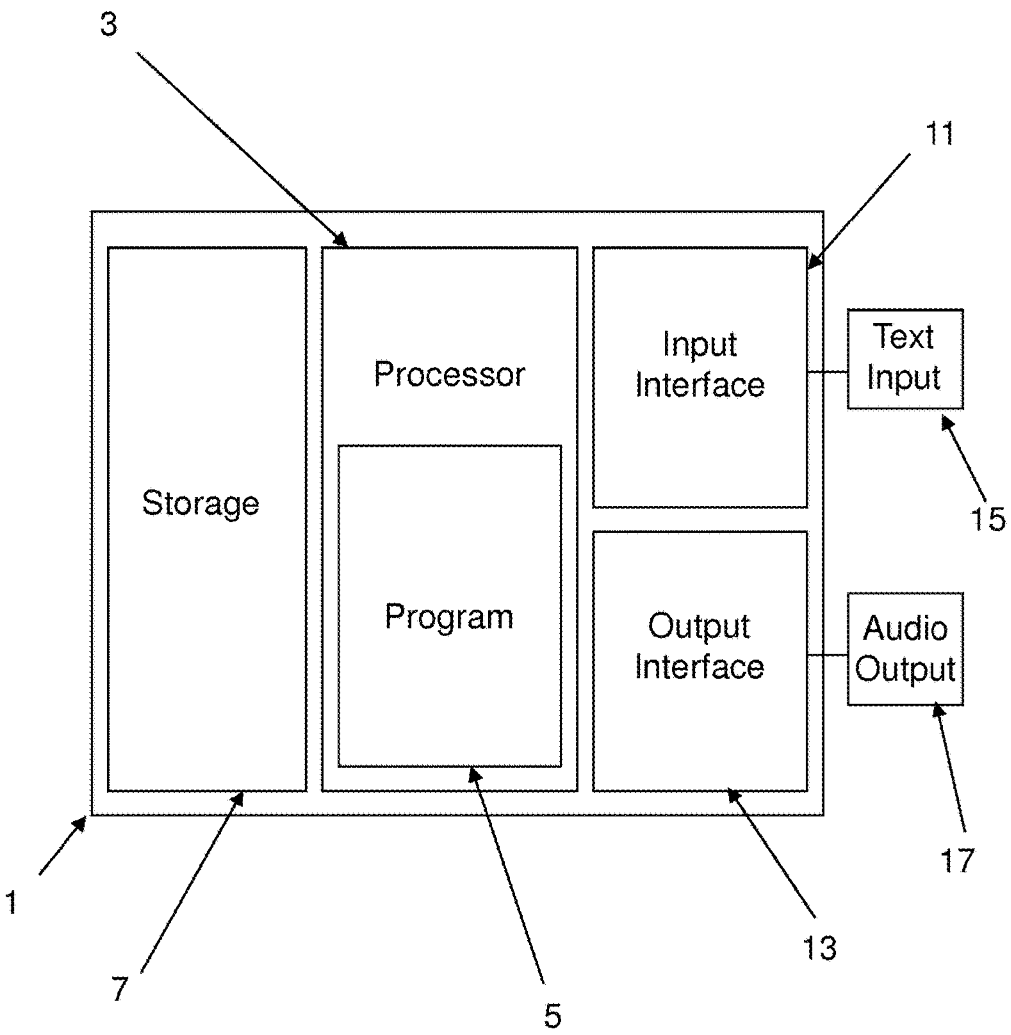
FIG. 1 shows a text to speech system.

According to one embodiment there is provided a method of training a speech synthesiser to convert a sequence of linguistic units into a sequence of speech vectors. The method comprises, in a training system comprising a controller, receiving speech data and associated linguistic units and fitting a set of models to the speech data and associated linguistic units. Said fitting comprises fitting a first set of one or more statistical models to higher spectral frequencies of the speech data to form a high frequency spectral stream and fitting a second set of one or more statistical models to lower spectral frequencies of the speech data to form a separate low frequency spectral stream. The method further comprises outputting the set of models.

By separately modelling the higher and lower frequency spectral streams, a more natural sounding speech synthesiser is produced. This is because the lower frequency spectral stream conveys a greater degree of linguistic information whereas the higher frequency spectral stream conveys more of the individual characteristics of the speaker. This means that these streams may be more effectively modelled separately than together.

"High" and "low" are relative terms and do not indicate actual values of frequency. More than two streams may be used for the spectrum. For instance, three or more spectral streams may be utilised. The models may be output by storing in memory or transferring by over a network to another device. The set of models model speech for each linguistic unit in the speech data as well as any unseen contexts not present in the speech data.

In one embodiment the first set of one or more statistical models are fitted more tightly to speech data than the second set of one or more statistical models. This means that the higher spectral frequencies, which convey less linguistic information but more of the individual speaker's characteristics, are modelled more tightly to the speech data to attempt to produce more natural speech samples.

In one embodiment the high frequency spectral stream is modelled using a first set of one or more decision trees and the low frequency spectral stream is modelled using a second set of one or more decision trees and the first set of one or more decision trees are larger than the second set of one or more decision trees, or the low frequency spectral stream is modelled using a deep neural network. Modelling the high frequency spectral stream using a larger decision tree than the low frequency spectral stream provides models that a fit more tightly to the speech data. Equally, utilising a deep neural network to model the low frequency spectral stream provides improved modelling as deep neural networks are more effective at modelling linguistic contexts whilst still allowing a large decision tree to be used with the high frequency spectral stream to provide more natural sounding speech.

By a larger decision tree it is meant that there are more leaf nodes. In one embodiment, one decision tree is generated per state per stream, where each linguistic unit comprises a number of states. In one embodiment two or more streams are used for the spectrum and decision trees are utilised for each stream. Each higher frequency decision tree is larger than the equivalent decision tree of the lower frequency stream. Each linguistic unit comprises a number of states, one decision tree is generated per state per stream and equivalent decision trees in different streams represent the same state.

In one embodiment fitting a first set of one or more statistical models comprises forming the first set of one or more decision trees by splitting each node in the one or more trees to a deeper level than the second set of decision trees. In one embodiment the first set of decision trees is split until each node comprises only one associated linguistic unit of the received linguistic units, at least in some nodes. This can be achieved by training with a minimum leaf node occupancy of one and a minimum description length of zero. This helps to generate speech which is as close as possible to the original training samples whilst still allowing unseen contexts to be modelled.

In one embodiment each linguistic unit comprises a number of states and the first and second sets of one or more statistical models are configured to produce, for each state, first and second sets of line spectral pairs respectively, wherein the first and second sets of line spectral pairs may be concatenated to form a combined spectrum for the state. Utilising line spectral pairs allows the separate spectral streams to be concatenated effectively to produce a combined spectrum.

In one embodiment the method comprises defining a boundary line spectral pair index that sets the boundary between the high and low frequency spectral streams, wherein the same boundary line spectral pair index is applied to each state being modelled, or each state of each linguistic unit is assigned its own specific boundary, or each state comprises a number of frames and each frame within each state is assigned its own specific boundary. Applying the same boundary to all states is less computationally complex, whereas varying the boundary based on each state or frame provides more natural sounding synthesised speech.

In one embodiment the same boundary line spectral pair index is applied to each state being modelled and defining the boundary line spectral pair index comprises determining the frequencies of the line spectral pairs for each state of the received speech data and defining the boundary line spectral pair index based on the median frequency of each of the line spectral pairs across all states relative to a predefined threshold frequency. The boundary line spectral pair index may be based on the line spectral pair index that has a median frequency that is closest to a threshold frequency or a median frequency that falls within a threshold range of frequencies.

In one embodiment the low frequency spectral stream is modelled using a second set of one or more decision trees and the first set of one or more decision trees are larger than the second set of one or more decision trees and each state of each linguistic unit is assigned its own specific boundary. The high and low frequency spectral streams are defined to overlap for all states across an overlapping range of line spectral pair indices, wherein the overlapping range is defined as the line spectral pair indices which have at least one state from the received speech data for which the respective line spectral pair index has a frequency that falls within a predefined range of frequencies. By overlapping the high and low spectral streams, the boundary may be varied depending on the state without requiring the streams to be retrained.

In one embodiment defining the boundary line spectral pair index for each state comprises, for each leaf node in each decision tree for the low frequency spectral stream: determining the median frequency for each line spectral pair index across all of the states of the received speech data in the leaf node, and determining the boundary line spectral pair index for the states in the leaf node based on the median frequency of each line spectral pair index relative to a predefined threshold frequency. The boundary line spectral pair index for a given leaf node may be based on the line spectral pair index that has a median frequency that is closest to a threshold frequency or a median frequency that falls within a threshold range of frequencies.

According to one embodiment there is provided a speech synthesis method comprising, in a speech synthesiser, receiving one or more linguistic units and converting said one or more linguistic units into a sequence of speech vectors for synthesising speech. Said conversion comprises modelling higher and lower spectral frequencies of the speech data as separate high and low spectral streams by applying a first set of one or more statistical models to the higher spectral frequencies and a second set of one or more statistical models to the lower spectral frequencies. The method further comprises outputting the sequence of speech vectors.

The method may comprise receiving text and converting text to linguistic units to be synthesised. Outputting may be via a vocoder to generate a speech waveform or the speech vectors may be stored or transferred to another device.

In one embodiment the first set of one or more statistical models are fitted more tightly to an original training speech data set than the second set of one or more statistical models.

In one embodiment the high frequency spectral stream is modelled using a first set of one or more decision trees and the low frequency spectral stream is modelled using a second set of one or more decision trees and the first set of one or more decision trees are larger than the second set of one or more decision trees or the low frequency spectral stream is modelled using a deep neural network.

In one embodiment converting said one or more linguistic units into a sequence of speech vectors comprises, for each of the one or more linguistic units, assigning a number of states for the linguistic unit. For each state in the linguistic unit one or more line spectral pairs are generated for each of the high and low frequency spectral streams and the line spectral pairs for the high and low frequency spectral streams are concatenated at a boundary to form a combined spectrum. Speech vectors are generated using the combined spectra for the states.

In one embodiment the same boundary is applied to each linguistic unit or each state of each linguistic unit is assigned its own specific boundary or each state comprises a number of frames and each frame within each state is assigned its own specific boundary.

In one embodiment the high and low frequency spectral streams are trained with a partial overlap. The high and low frequency spectral streams may therefore be generated with an overlap and then concatenated based on the specific boundary assigned to each state being generated.

In one embodiment, the high and low frequency spectral streams overlap for all states across an overlapping range of line spectral pair indices; and either: each state of each linguistic unit is assigned its own specific boundary, and a boundary line spectral pair index is defined for each state to set the boundary for that state, wherein defining the boundary line spectral pair index for each state comprises determining the corresponding frequency for each line spectral pair in the low frequency spectral stream for that state and determining the boundary line spectral pair index based on an assessment of the frequencies of the line spectral pairs for the state relative to a predefined threshold frequency; or each state of each linguistic unit comprises a number of frames, wherein each frame unit is assigned its own specific boundary, and a boundary line spectral pair index is defined for each frame to set the boundary for that frame, wherein defining the boundary line spectral pair index for each frame comprises determining the corresponding frequency for each line spectral pair in the low frequency spectral stream for that frame and determining the boundary line spectral pair index based on an assessment of the frequencies of the line spectral pairs for the frame relative to a predefined threshold frequency.

This allows the boundary between the high and low spectral streams to be defined for each state or each frame being synthesised in real time during synthesis. The boundary for each frame may be assigned based on the highest line spectral pair that has a frequency that falls below the predefined threshold frequency or the lowest line spectral pair that has a frequency that falls above the predefined threshold frequency.

In one embodiment there is provided a carrier medium comprising computer readable code configured to cause a computer to perform any of the above methods.

According to one embodiment there is provided a speech synthesiser comprising a processor configured to receive one or more linguistic units, convert said one or more linguistic units into a sequence of speech vectors for synthesising speech, and output the sequence of speech vectors. Said conversion comprises modelling higher and lower spectral frequencies of the speech data as separate high and low spectral streams by applying a first set of one or more statistical models to the higher spectral frequencies and a second set of one or more statistical models to the lower spectral frequencies.

According to one embodiment there is provided a training system for a speech synthesiser to convert a sequence of linguistic units into a sequence of speech vectors, the training system comprising a controller configured to receive speech data and associated linguistic units, fit a set of models to the speech data and associated linguistic units, and output the set of models. Said fitting comprises fitting a first set of one or more statistical models to higher spectral frequencies of the speech data to form a high frequency spectral stream and fit a second set of one or more statistical models to lower spectral frequencies of the speech data to form a separate low frequency spectral stream.

Text to Speech

Embodiments described herein model the high frequency spectrum of speech separately from the low frequency spectrum. The high frequency band, which does not carry much linguistic information, is clustered using a large decision tree so as to generate parameters as close as possible to natural speech samples. The boundary frequency between the high and low frequency spectra can be adjusted at synthesis for each state. Subjective listening tests show that the proposed approach is significantly preferred over the conventional approach of using a single spectrum stream. Samples synthesised using the proposed approach sound less muffled and more natural.

Statistical parametric speech synthesis, while outperforming unit selection systems in terms of discontinuity artefacts and ability to cope with sparse data, is known to have problems with over-smoothing, which leads to a muffled sensation in the synthesised output. Several approaches have been proposed to address this problem in the domain of Hidden Markov Model (HMM) based synthesis. There are two main directions to overcome this problem: one by improvements in statistical modelling, and the other in vocoding. Embodiments implement improved statistical modelling to provide more lifelike synthesised speech.

FIG. 1 shows a text to speech system 1. The text to speech system 1 comprises a processor 3 which executes a program 5. The processor 3 comprises processing circuitry configured to enact the text to speech methods described herein. The text to speech system 1 further comprises storage 7. The storage 7 is memory that stores data which is used by program 5 to convert text to speech. The storage 7 also stores computer executable code which, when executed by the processor 3, instructs the processor 3 to enact the methods described herein.

The text to speech system 1 further comprises an input interface 11 and an output interface 13. The input interface 11 is connected to a text input 15. Text input 15 receives text. The text input 15 may be, for example, a keyboard. Alternatively, text input 15 may be a means for receiving text data from an external storage medium or a network.

Connected to the output interface 13 is output for audio 17. The audio output 17 is used for outputting a speech signal converted from text which is input into text input 15. The audio output 17 may be for example a direct audio output, e.g. a speaker or an output for an audio data file which may be sent to a storage medium, networked etc. Alternatively, the text to speech system 1 may output, via the output interface 13, a set of speech parameters that may be used to generate a speech signal, for instance, by a vocoder.

In use, the text to speech system 1 receives text through text input 15. The program 5 executed on processor 3 converts the text into speech data using data stored in the storage 7. The speech is output via the output module 13 to audio output 17.

The text to speech system 1 stores models for synthesising speech. These models may be either trained by the text to speech system 1 itself by analysing one or more sets of training data, or may be trained by an external system and loaded onto the text to speech system 1.

Figure 2:
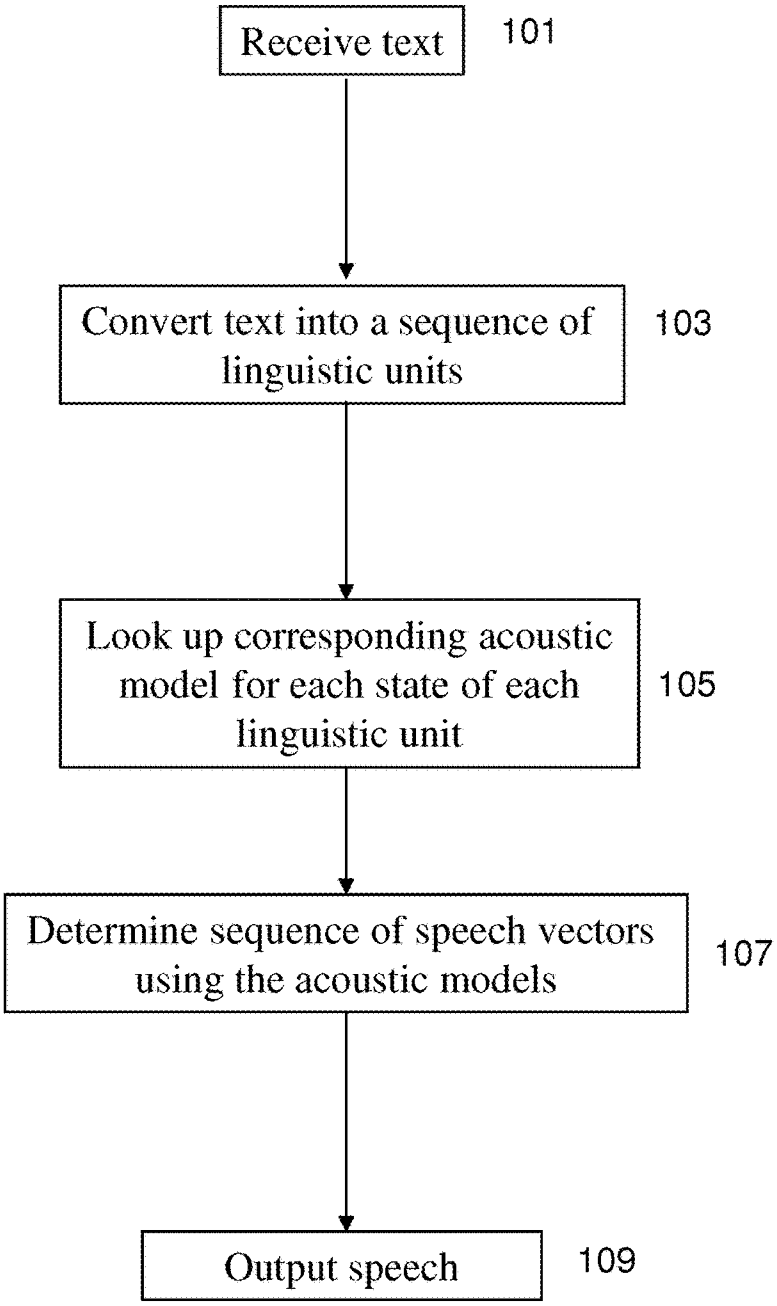
FIG. 2 shows a text-to-speech method.

A simplified text to speech process will now be described with reference to FIG. 2. This process may be enacted by a device such as the text to speech system of FIG. 1. In a first step, 101, text is input. The text may be input via a keyboard, touch screen, text predictor or the like.

The text is then converted 103 into a sequence of linguistic units. These linguistic units may be phonemes or graphemes or may be segments of phonemes or graphemes, such as sub-phonemes or sub-graphemes.

Linguistic information in the text, including linguistic context features is associated with each linguistic unit. Linguistic context features can be any information that is obtained from the text. Linguistic context features may be phonetic information (for example first phone or last phone), prosodic information (for example the position of syllable in accent group), or any other form of information. The linguistic context features may further comprise semantic (for example, positive as opposed to negative words) and/or syntactic (for example verbs and nouns, etc.) information.

The conversion of text into linguistic units and the determination of linguistic context features are known in the art. One example is the Festival Speech Synthesis System from the University of Edinburgh.

Each linguistic unit will have a certain duration. That is, each linguistic unit will be broken up into a number of states, with each state comprising one or more frames. In one embodiment, each linguistic unit is divided up into five states.

In step 105, the corresponding acoustic model for each state of each linguistic unit is looked up based on the associated linguistic context features (contextual information). Each acoustic model comprises probability distributions relating the associated linguistic unit to a set of speech parameters. The speech parameters correspond to a linear parameterization of a speech signal contour over the frames encompassed by the linguistic unit according to a speech vector model. The process of parameterization during the training of the speech vector model will be discussed below.

In an embodiment, the mapping from linguistic units to acoustic models is carried out using decision trees, which will be described later. For each stream, one decision tree is utilised per state (i.e. if there are five states per linguistic unit then there are five decision trees per stream).

In another embodiment the mapping is achieved by employing a neural network model. This is, for example, described in Bishop, C. M. (1995) Neural Networks for Pattern Recognition, Clarendon Press, Chapter 6, which is herein incorporated by reference in its entirety.

A further alternative method utilises deep neural networks (DNN). A DNN is used in steps 105 and 107 to determine the output features for each frame, rather than using decision trees and HMMs. The linguistic units with context are converted into a set of input vectors which are then directly mapped to output vectors by a trained DNN.

In yet another embodiment, the mapping is achieved using a linear model.

The phonetic-to-acoustic map is predetermined, e.g. via training of the system in order to fit models to linguistic units. This training may be performed by the text to speech system 1 itself, or by an external system which provides the trained models to the text to speech system 1.

In step 107 each acoustic model is used to produce a sequence of speech parameters or speech vectors over time. During synthesis, it is assumed that each linguistic unit does not have a definitive one-to-one correspondence to a speech vector or "observation" to use the terminology of the art. Many linguistic units are pronounced in a similar manner, are affected by surrounding linguistic units, their location in a word or sentence, or are pronounced differently by different speakers. Thus, each linguistic unit only has a probability of being related to a speech vector and text-to-speech systems calculate many probabilities and choose a sequence of observations given a sequence of linguistic units.

In the present embodiment, the acoustic models are Hidden Markov Models (HMMs). In one embodiment, the probability distributions of the acoustic models will be Gaussian distributions which are defined by means and variances. However, it is possible to use other distributions such as the Poisson, Student-t, Laplacian or Gamma distributions, some of which are defined by variables other than the mean and variance.

Each acoustic model separately models speech as an excitation signal passed through a filter. The excitation signal may include fundamental frequency (f0) and band aperiodicity (bap) as separate streams. The filter generally comprises a spectral stream. The streams form a set Hidden Markov Models for producing speech. Each stream has its own speech vector comprising speech parameters generated by the respective HMM.

The acoustic models (HMMs) are concatenated, for instance, over a sentence, to produce a single HMM which is used to determine a sequence of speech parameters. Accordingly, spectral, f0 and band aperiodicity parameters are determined over time. The duration of each linguistic unit is determined as well. The duration may be determined prior to generating the speech parameters or after the generation of speech parameters.

Once a sequence of speech vectors has been determined, synthesised speech is output in step 109. The output speech signal may be the speech parameters, or speech vectors. The output vectors can be used to generate an output speech waveform using a vocoder. Alternatively, a speech waveform may be generated and output. The fundamental frequency and band aperiodicity features are used to produce an excitation signal which is passed through a filter generated via the spectral stream. The excitation signal is convolved with the filter to produce synthesised speech.

HMM-based synthesis is able to generate coherent speech from relatively small training data sets; however, this speech generally has a muffled quality due to the statistical nature of the modelling. An alternative method is waveform-based synthesis (concatenative synthesis) which concatenates short samples of recorded sound. This is able to provide more natural sounding speech than HMM-based synthesis; however, it requires a much larger sample size for training the models.

Many hybrid approaches combine waveform-based and HMM-based synthesis, combining the benefit of naturalness of the waveform-based approach and the smoothness of the HMM approach. HMMs are used to generate the parameters which are then used to select the best matching waveform segments. Other methods have mixed HMM-based and waveform-based speech segments in the time domain, but this can lead to voice quality mismatch as the segment switches from one type to the other.

Embodiments implement an approach entirely within a statistical framework (such as the Hidden Markov Model (HMM) framework or the Deep Neural Network (DNN) framework), in which the spectrum is modelled in multiple streams, separated in the frequency domain.

In HMM text to speech (HMM-TTS), the spectrum is usually modelled as one stream. The muffled quality of some HMM systems is produced by the statistical blurring of similar linguistic units. The spectral envelope in the low frequency region carries linguistically important information, whereas the region above is mostly free of such constraints and is assumed to reflect the resonances of the vocal tract, thereby carrying information relating predominantly to the individual speaker. Given that the high frequency regions carry relatively little information about the linguistic content, the inventors have realised that better quality synthesised speech may be achieved by splitting the spectrum stream into high/low frequency bands and clustering the contexts separately. In addition, if the decision tree for the high frequency spectrum is allowed to grow unbounded, this becomes almost equivalent to using natural speech samples in the high frequency band, thereby reducing the over-smoothing effect and producing clearer speech.

The inventors have therefore realised that the upper and lower frequency spectra can be modelled independently, thereby allowing the higher spectrum to be fitted more tightly to specific training data to more accurately reflect the specific training data (be less context dependent). This allows the lower frequency spectrum to maintain context dependence whilst the higher frequency spectrum (which is less context dependent) produces a more natural sound with less of the muffled quality present in other HMM systems.

Whilst a sample-based spectrum in the high frequency band may be combined with a statistically generated spectrum in the low frequency band, the high frequency band would require a large sample size to produce natural sounding speech. Moreover, this creates problems when concatenating a statistically generated spectrum with a sample-based spectrum.

Utilising statistical models for both the high and low frequency spectra allows the two spectral streams to be modelled independently whilst also simplifying concatenation. This also produces a system which is able to cope more effectively with sparse training data. The decision tree for the high frequency band may be allowed to grow unbounded, thereby yielding rich models that are as close to natural speech as possible.

Mel-scaled line spectral pairs (MLSP) parameterisation is employed, so at synthesis, the low and high frequency spectral parameters can be concatenated to generate the full-band spectral envelope. The boundary dividing the high and low frequency spectra can be adjusted state-by-state at synthesis according to the boundary decision pertaining to each leaf of the decision tree.

Multi-Stream Spectrum Modelling

Factorisation of linguistic information and speaker information can be used in voice conversion and speaker identity. Whilst a complete factorisation may not be possible due to some degree of speaker characteristics being present in the low frequency band and some linguistic information being present in the high frequency band (e.g. for sibilants), it can be assumed that the two frequency bands have different contextual variations that would be better modelled separately.

The frequency band between 12-22 ERB (Equivalent Rectangular Bandwidth), equivalent to 603-2212 Hz, mainly contains vowel characteristics, and the spectral envelope above this range contains mainly speaker individualities. The average range of the second formants of the cardinal vowels for a male voice is between 595 Hz and 2400 Hz. The frequencies can be even higher for female voices, sometimes extending beyond 2500 Hz depending on the speaker and language.

In accent morphing between two speakers with selective morphing in the frequency domain, the best intelligibility may be achieved when the spectrum is split at 3.5 kHz with a 1 kHz transition band in which the spectral characteristics between the two speakers are interpolated. In this condition, all spectral information above 4 kHz comes from the target speaker.

In the current embodiments, a frequency boundary of $F_b$=4 kHz is adopted and translated into line spectral pair (LSP) coefficients $\omega_b$.

Decision Tree

Decision trees may be used to control the state-tying of context-dependent models. When training HMM models, decision trees are formed in which each node represents a binary context related question (e.g. is the previous phoneme a silence? Is the next phoneme vowels?). The states falling within each answer of the question are clustered together and passed on via respective branches. Models are fitted to the resulting clustered states. The question for each node is chosen based on a goodness of split criterion (such as, the question that maximises the likelihood of the states over the resulting clusters, or that reduces the description length of the models the most).

The clusters continue to be split until a stopping criterion has been reached. The stopping criterion may be that the likelihood gain falls below a threshold or a minimum number of states for a node is reached. The Minimum Description Length, MDL, may be used as a stopping criterion. The MDL principle states that the best model for a given set of data is that which provides the best compression of the data. The description length of a model is dependent on the number of states in each node and the complexity of the model. Where splitting achieves a reduction in the description length that is less than a specified threshold, then the node is not split.

The states of the end nodes (leaf nodes) are clustered together and the same model is used to generate speech for each state in the node. States for any contexts which are missing from the training data are modelled based on the leaf nodes into which the states fall (based on the answers to the phonetic questions for the missing contexts). That is, the most similar leaf node is used to synthesise the state.

Decision trees provide an effective method of synthesising speech for unseen linguistic units (contexts which are not present in the training data). Having said this, as multiple states are described by a single model based on probability, this also causes an over-smoothing of parameters, leading to a muffled sensation in the synthesised output.

An increase in tree size leads to fewer samples in the leaf nodes and hence alleviates the averaging effect thereby producing more natural sounding speech. The tree size can be increased by relaxing the stopping criteria (e.g. reducing the MDL threshold, the probability threshold or the minimum leaf node occupancy).

According to an embodiment, the low frequency spectrum is modelled with a robust decision tree in order to handle sparseness in the training corpus. The high frequency spectrum, on the other hand, is less affected by contextual factors and thus its tree can be allowed to grow larger. Accordingly, more strict stopping criteria are used when training the decision tree of the lower frequency spectrum than when training the higher frequency spectrum. In one embodiment, the decision tree of the higher frequency spectrum is formed such that each leaf node comprises a single state from the training data. That is, the only stopping criterion used is the minimum leaf node occupancy, which is set to one. In addition, a minimum description length of 0 may be used.

Whilst the embodiments above implement decision trees, other methods of training and modelling speech data may be utilised. It is generally beneficial to train the higher and lower frequency spectra independently due to the differing characteristics of the two spectra (lower frequency being more context dependent, higher frequency including more features relating to the individual speaker). As the higher frequency spectrum is less context dependent, it may be trained to include more models, each model being more specifically fitted to a smaller set of training data. This reduces the averaging effect of the statistical modelling, thereby producing more natural sounding speech.

In one embodiment, the low frequency spectrum is modelled using deep neural networks whilst the high frequency spectrum is modelled using HMMs with a large decision tree (e.g. a minimum leaf node occupancy of one). DNNs generally model linguistic contexts better than HMMs as they provide a clearer spectrum with less blurring. Having said this, DNN output is still statistically modelled. HMMs with a large decision tree in the high frequency spectrum may be able to provide more natural sounding speech. By splitting the spectrum into high and low frequency streams, the most appropriate mapping method can be used for each spectrum.

In further embodiments, the spectrum may be split into more than two spectra. Each spectrum may be modelled separately. With the tightness of the modelling to the training data (the amount of averaging across states) progressively increasing for each spectrum as the frequency increases. For instance, the lowest frequency spectrum may be modelled using deep neural networks, or a relatively small decision tree. The next lowest frequency spectrum may be modelled via a slightly larger decision tree. This trend may continue up to the highest frequency spectrum which may be modelled via a decision tree that maps each state in the training data to a single model.

Figure 3A:
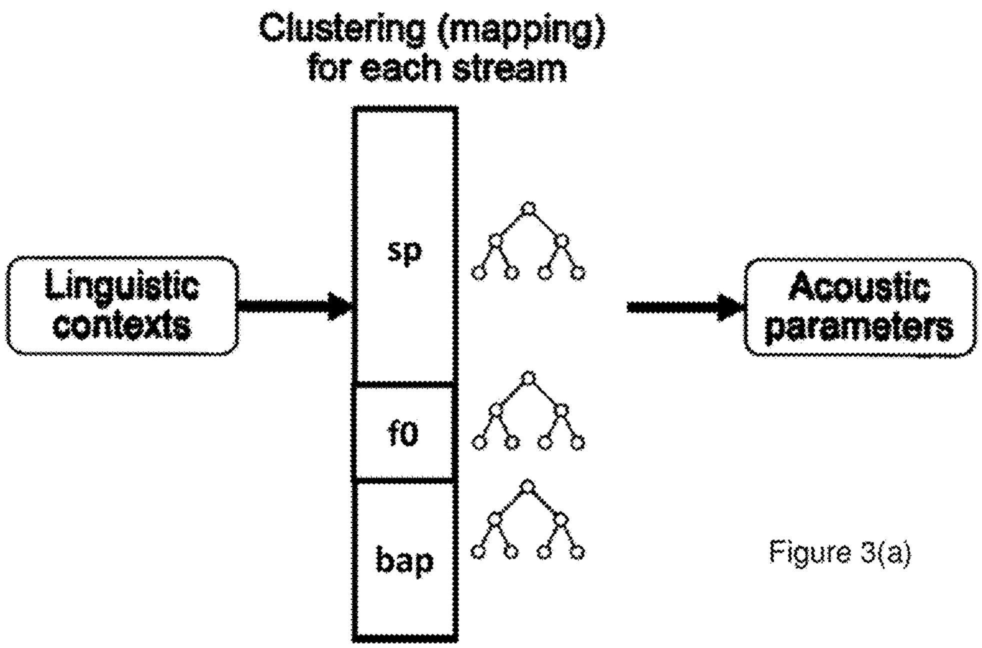
FIG. 3(*a*) shows clustering (mapping) for streams for a system with a single spectral stream.
Figure 3B:
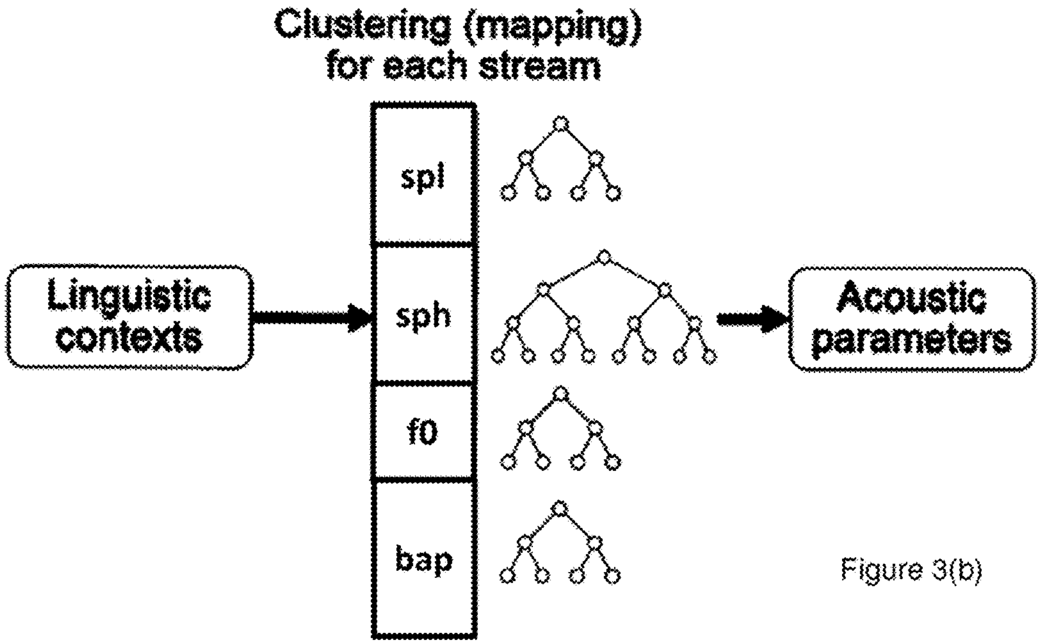

FIGS. 3(*a*) and 3(*b*) show clustering (mapping) for streams for systems with a single spectral stream and two spectral streams respectively.

FIG. 3(*a*) shows a method of clustering linguistic units together. Three streams are utilised: the spectral stream (sp), the fundamental frequency stream (f0) and the band aperiodicity stream (bap). Accordingly, in this case the spectrum is modelled as a single stream spanning from 0 kHz up to the Nyquist frequency.

Each stream is trained separately to produce its own decision tree thereby clustering linguistic contexts as discussed above. When synthesising speech, linguistic contexts are initially input. The decision trees for the streams are used to determine the models for the linguistic contexts. The models are then used to generate acoustic parameters which can be used to generate an acoustic output.

The fundamental frequency and band aperiodicity streams are used to form an excitation signal. The spectral stream is used to produce a filter. The excitation signal is passed through the filter to produce a speech waveform.

FIG. 3(*b*) shows a method of clustering linguistic units together according to an embodiment. The method is similar to that of FIG. 3(*a*); however, the spectral stream is split into a high frequency band (sph) and a low frequency band (spl).

The low frequency regions (e.g. below 4 kHz) of the spectrum carry a larger amount of information regarding the linguistic content of speech (e.g. in the form of formants). On the other hand, the high frequency regions of the spectrum carry more speaker specific information (but less information about the linguistic content). It therefore follows that different context clustering may be appropriate for different frequency bands. The spectrum is therefore split into a high and a low frequency stream so that these two frequency ranges may be modelled separately.

The decision tree for the high frequency spectral stream is allowed to grow larger than the decision tree for the low frequency spectral stream. This results in a larger number of models in the high frequency spectral stream with each model being fit to a smaller number of states from the training data. In one embodiment, the decision tree of the high frequency spectral stream is allowed to grow until each leaf node contains a single state (although in certain circumstances, it is possible that some states cannot be split and therefore must be grouped together). This means that, generally, each state in the training data is modelled with a different set of parameters. This helps to generate speech which is as close as possible to the original training samples. The decision tree is still required in the frequency stream so that 'unseen' contexts which are not found in the training data may be synthesised. Such unbounded training is not applied to the whole spectral stream as it is unlikely that the resulting models would effectively reproduce unseen contexts. This is less of an issue with the high frequency spectral stream as it contains much less context information.

The low frequency spectral stream is trained normally, with the decision tree being limited, for instance, with the MDL or likelihood stopping criteria discussed above. This produces models with are more effective at modelling unseen contexts in the low frequency spectral stream which contains a greater amount of context information. Alternatively, the low frequency spectral stream is modelled using deep neural networks.

Line Spectral Pairs (LSP) Parameterisation

In one embodiment, line spectral pairs (LSPs) are used to describe the spectra. This allows the higher and lower frequency spectra to be combined more easily. As each cepstral coefficient affects the frequency components of the spectrum, it would be more difficult to concatenate the spectra if cepstrum were used.

Line spectral pairs can be used to describe the linear prediction coefficients for a spectrum. The linear prediction coefficients describe the model and are fitted to the training data.

The following all-pole representation for the spectral envelope is defined:

$$H_a(z) = \frac{1}{A(z)}$$

where A(z) is a linear prediction polynomial:

$$A(z) = 1 - \sum_{k=1}^{p} \alpha_k z^{-k}$$

where $a_k$ is the $k^{th}$ prediction coefficient and p is the order of the model. The linear prediction coefficients $a_k$ are calculated during training (they are fitted to the training samples). This may be achieved by minimising the mean square error between the training samples and the synthesised speech via an autocorrelation method.

A(z) can be expressed as a combination of a palindromic polynomial, P, and an antipalindromic polynomial, Q, $$A(z)=0.5[P(z)+Q(z)]$$

where:

$$P(z)=A(z)+z^{-(p+1)}A(z^{-1})$$

$$Q(z)=A(z)-z^{-(p+1)}A(z^{-1})$$

where z is a complex number on the z-plane ($z=e^{i\omega}$). The line spectral coefficients are the location of the roots of P and Q in the complex plane (the z-plane). As the roots are located on a unit circle in the complex plane, they are defined in terms of their angle ($\omega_k$) in the complex plane ($\omega_k$ such that $z=e^{i\omega_k}$, where P(z) or Q(z) equal 0). The angles ($\omega_k$) are therefore line spectral frequencies expressed in radians and these are used as the line spectral coefficients for the generation of the spectral parameters.

The palindromic polynomial, P(z), corresponds to the vocal tract with the glottis closed and the antipalindromic polynomial. Q(z), corresponds to the vocal tract with the glottis open.

The line spectral frequencies can be used to determine the power spectrum. It can be shown that, given the line spectral frequencies ($\omega_k$–the roots of the P(z) and Q(z)), the values of P(z) and Q(z) can be determined:

$$P(z) = (1 - z^{-1}) \prod_{k=2,4,\ldots,p} (1 - 2z^{-1} \cos \omega_k + z^{-2})$$

$$Q(z) = (1 + z^{-1}) \prod_{k=1,3,\ldots,p-1} (1 - 2z^{-1} \cos \omega_k + z^{-2})$$

The power spectrum can then be calculated from:

$$|H(e^{i\omega})|^2 = \left|\frac{1}{(Ae^{i\omega})}\right|^2 = \frac{4}{|P(e^{i\omega}) + Q(e^{i\omega})|^2}$$

therefore:

$$|H(e^{i\omega})|^2 = \frac{2^{-p}}{\sin^2\frac{\omega}{2}\Pi_{k=2,4,\ldots,p}(\cos\omega - \cos\omega_k)^2 + \cos^2\frac{\omega}{2}\Pi_{k=1,3,\ldots,p-1}(\cos\omega - \cos\omega_k)^2}$$

Accordingly, the line spectral pair coefficients (the line spectral frequencies) can be used to determine the spectrum.

In one embodiment, the LSP coefficients may be mel-LSP (MLSP) coefficients. These are LSP coefficients ($\omega_k$) adapted to the mel-scale.

The use of LSP coefficients to represent the spectrum facilitates the multi-stream approach. It is possible to simply concatenate the high and low frequency coefficients generated from separate streams. The concatenated LSP coefficients are then used to generate the spectrum. Using the cepstrum representation, splitting the frequency regions would be more difficult, as each cepstral coefficient affects all of the frequency components of the spectrum.

Static Boundary Coefficient

In the simplest embodiment, the same splitting boundary coefficient can be used to divide the higher and lower frequency spectra for every state.

The training data is analysed using known signal processing methods to extract the LSP coefficients for each frame. The median frequency across all states in the training data is determined for each LSP coefficient. The boundary coefficient index is then chosen based on which LSP coefficient has a median frequency within a predetermined range of frequencies (e.g. 3.5 kHz to 4 kHz).

Figure 4:
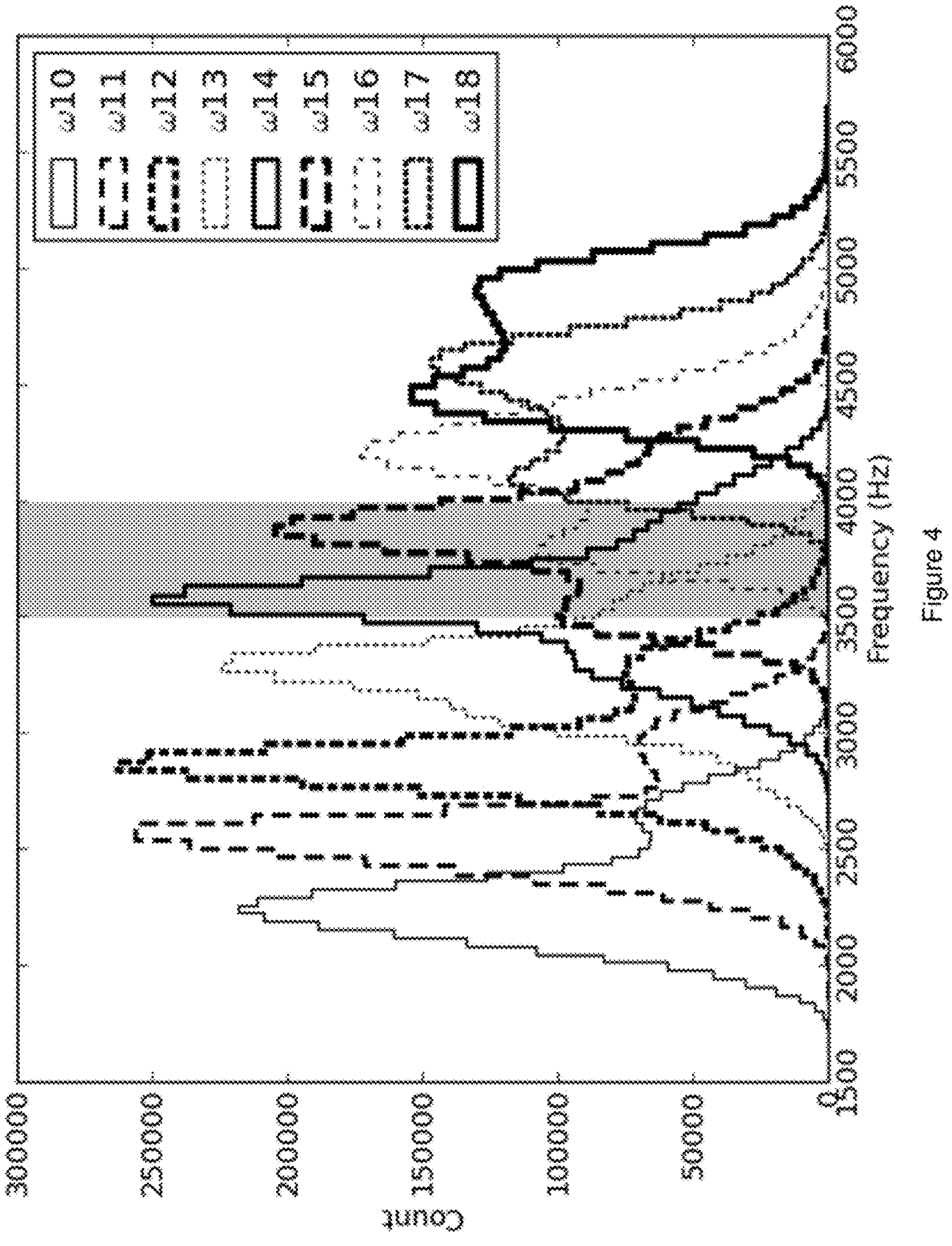
FIG. 4 shows the distribution of Mel-scaled Line Spectral Pair (MLSP) coefficients for training data for a model with a sampling frequency of 22.05 kHz and 39 MLSPs.

FIG. 4 shows the distribution of LSP coefficients for training data for a model with a sampling frequency of 22.05 kHz and 39 MLSPs. The distributions for $\omega_1$ to $\omega_{18}$ are shown. For each LSP coefficient (from $\omega_{10}$ to $\omega_{18}$), the number of states in the training data where the LSP coefficient has a specific frequency is plotted against frequency.

The frequency band is shown as a shaded region (between 3.5 kHz and 4 kHz). From FIG. 4 it can be seen that only $\omega_{14}$ and $\omega_{18}$ have median frequencies that fall within the frequency range of 3.5 kHz to 4 kHz. Since LSPs usually come in pairs, it makes sense to split after an even number. Accordingly, hence $\omega_{14}$ is chosen to be the boundary coefficient for all states.

Whilst the above embodiment utilises a range of frequencies to determine the boundary coefficient, this may equally be determined using a single threshold. For instance, the boundary coefficient may be chosen to be the LSP coefficient that has a median that is the closest to a predefined threshold (e.g. 4 kHz), the LSP coefficient that has the lowest median that exceeds a predefined threshold, or the LSP coefficient that has the largest LSP coefficient that is less than a predefined threshold. Accordingly, a boundary coefficient can be chosen that is best suited to be applied across all possible states.

Having said this, the index of the LSP coefficient corresponding to a specific frequency (for instance, the region around 3.5 kHz to 4 kHz) will vary from state to state. More generally, it can be assumed to vary depending on the phone type and the context. Accordingly, it can be advantageous to assign a specific boundary coefficient for each state.

Flexible Boundary Coefficient

Decision tree-based context clustering provides a way to adjust the boundary for each state. A decision tree is formed for each of the low and high frequency spectral streams. As discussed herein, different stopping criteria are used in the formation of the two decision trees. Having said this, in order to form the decision trees for the high and low frequency spectral streams, the range of possible boundary coefficients across all of the states must first be considered.

As the frequency for a given LSP coefficient index will vary depending on the state, the high and low spectral streams must be formed with an overlap in LSP coefficient indices. This allows specific boundary coefficients to be assigned to each state.

The overlapping range is determined using a decision tree for the whole spectrum (an undivided spectrum including the high and low frequency spectral streams). As with the static boundary method, the LSP coefficients for the training data may be obtained using known signal processing techniques prior to training. The overlapping range is chosen by picking the LSP coefficient indices which have at least one training sample where the LSP coefficient has a frequency that falls within a predefined frequency range.

The predefined frequency range runs between lower and upper threshold frequencies (e.g. from 3.5 kHz to 4 kHz). Accordingly, the low frequency spectral stream will comprise the LSP coefficient indices that comprise at least one training sample that is less than or equal to the upper threshold frequency and the high frequency spectral stream will comprise the LSP coefficient indices that comprise at least one training sample that is greater than or equal to the lower threshold frequency. In other words, the overlapping region is chosen to include all LSP coefficient indices (from the entire set of states in the training data) that span a prescribed frequency range between upper and lower frequency thresholds (e.g. 3.5 kHz to 4 kHz).

Going back to FIG. 4, it can be seen that, for this particular 22.05 kHz model with 39 MLSPs, the coefficients that comprise at least one sample within the frequency range of 3.5 kHz to 4 kHz are $\omega_{12}$ to $\omega_{17}$. Accordingly, in this embodiment, the low frequency spectral stream would consist of $\omega_1$ to $\omega_{17}$ and the high frequency spectral stream would consist of $\omega_{12}$ to $\omega_{39}$.

Figure 5:
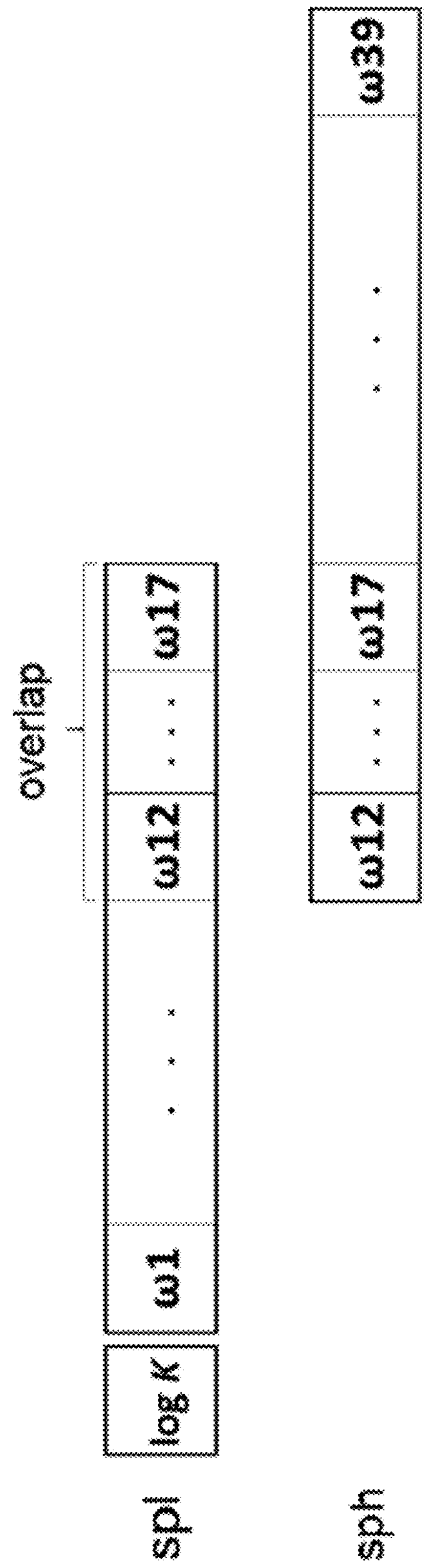
FIG. 5 shows overlapping low (spl) and high (sph) frequency spectral streams.

FIG. 5 shows the overlapping low (spl) and high (sph) frequency spectral streams of the above embodiment. It can be seen that the spectral streams overlap at LSP coefficients of $\omega_{12}$ to $\omega_{17}$, that is, both the low and high frequency spectral streams comprise LSP coefficients $\omega_{12}$ to $\omega_{17}$. The log gain (log K) is included in the low frequency stream as part of the LSP vector; however, alternative embodiments include the log gain in its own stream. These overlapping streams can then be used to form decision trees to determine the specific boundary coefficient for each cluster.

The decision trees for the overlapping high and low spectral streams are formed. For the tree for the low frequency spectral stream, a boundary coefficient is determined for each cluster in the tree. Again, this utilises LSP coefficients determined from the training data via known signal processing methods. The decision tree for the low frequency spectrum rather than the high frequency spectrum is used to guide this decision because it is likely to be more sensitive to the kind of contextual difference that would affect the boundary frequency.

In a first embodiment, the boundary coefficients for each cluster are determined and stored so that they may be retrieved during synthesis. In a second embodiment, the boundary coefficients may be generated on the fly during synthesis.

In the first embodiment, for each cluster in the decision tree for the low frequency spectral stream, statistics of the frequencies for each LSP coefficient $\omega_k$ for all the training samples in that cluster are collected. The lowest coefficient for which the median frequency across the cluster exceeds a predetermined threshold frequency $F_b$ (e.g. 4 kHz) is then set as the threshold coefficient $\omega_b$ for that cluster. The threshold coefficient $\omega_b$ for each cluster (each leaf node in the decision tree) is then stored in memory, such as in a look-up table, so that it may be accessed during speech synthesis. This method is applied to each cluster in the low frequency decision tree to assign specific boundary coefficients to the clusters.

By providing the overlapping range, the predetermined threshold frequency $F_b$ can be easily varied depending on the context without requiring the decision trees to be recalculated.

Figure 6:
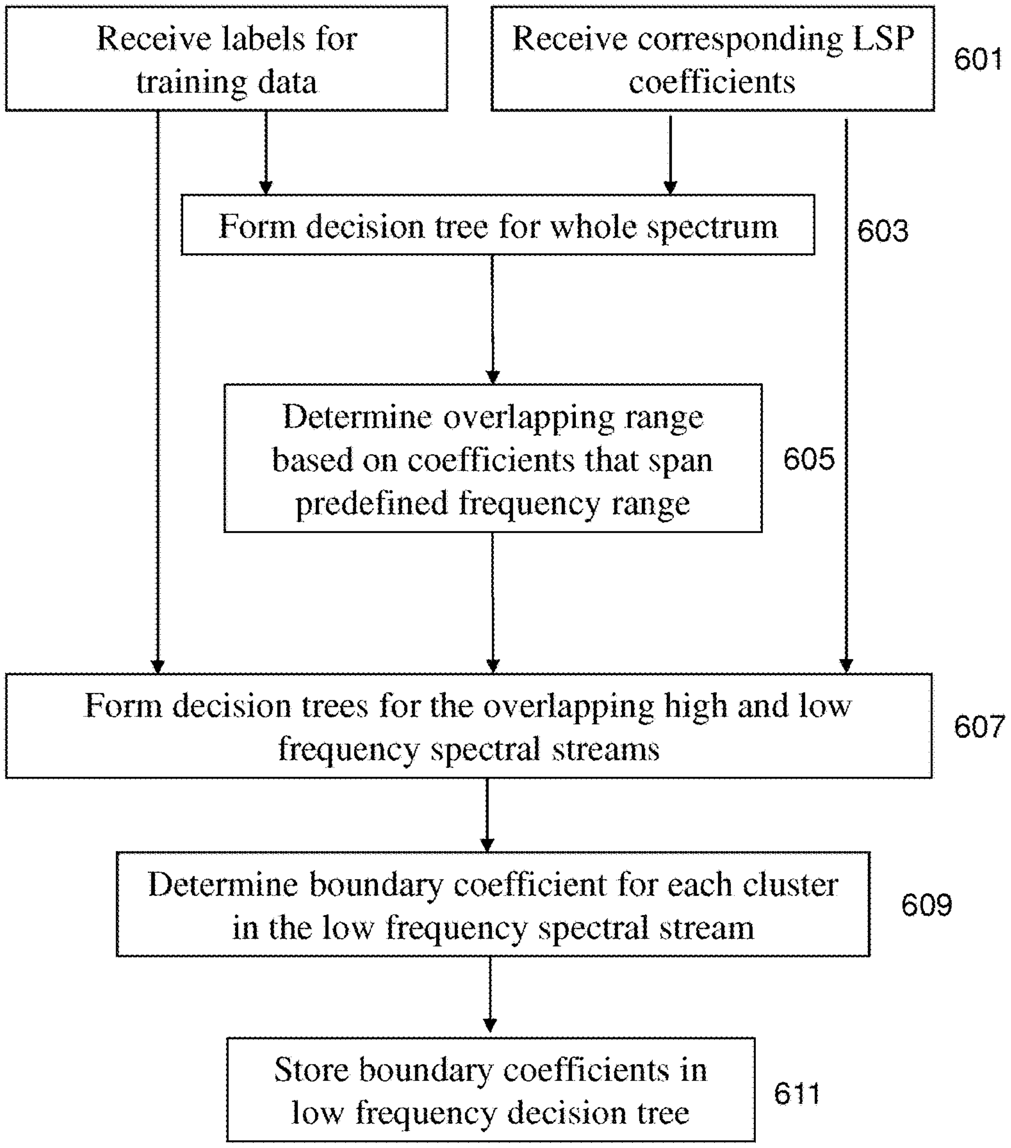
FIG. 6 shows a method of determining the boundary coefficients based on a set of training data samples.

FIG. 6 shows a method of determining the boundary coefficients based on a set of training data samples. This method may be implemented by a system such as that shown in FIG. 1.

In step 601 training samples (labels and acoustic parameters, e.g. LSPs) are received. A decision tree is then formed for the whole (undivided) spectrum 603. This involves taking each state in each linguistic unit and clustering similar states as described above.

The distribution of LSP coefficients is used to determine the overlapping range for the high and low frequency spectral streams 605. The overlapping range is the set of coefficients that span a predefined frequency range, that is, the overlapping range is the set of coefficients that have at least one state from the training speech samples that falls within the predefined frequency range. The overlapping range is then used to determine the LSP coefficients in the high and low frequency spectral streams.

Decision trees for the overlapping high and low frequency spectral streams are then formed using the same training samples but with the LSP coefficients split into high and low frequencies and the clusters are modelled 607. The boundary coefficient for each cluster in the low frequency spectral stream is then determined 609. In the present embodiment, the boundary coefficient is taken to be the lowest LSP coefficient having a median frequency (from the training samples in the cluster) that is greater than a predefined threshold frequency. The boundary coefficients for each cluster are then stored in the low frequency decision tree 611.

Accordingly, the boundary coefficient can be looked up from the low frequency decision tree when synthesising speech.

In the second embodiment, the boundary coefficients are determined on the fly at synthesis time, without reference to the decision tree. The boundary coefficient may be decided for each frame based on the LSP coefficients for generated for the low frequency stream for that frame. Again, the low frequency stream has been trained to overlap partially with the high frequency stream, as discussed above. In this case, the frequencies of the LSP coefficients in the low frequency stream are determined and the highest LSP coefficient under a predetermined threshold frequency, $F_b$, (e.g. 4 kHz) is taken as the boundary coefficient for that frame, and all LSP coefficients above are assigned to the high frequency stream.

The LSP coefficients for the two streams can be concatenated together at the boundary coefficient to form the full band. The concatenated LSP coefficients are then used to filter the excitation signal. In some embodiments, the spectral stream may be divided into more than two streams with a number of corresponding boundary coefficients. In this case, these are concatenated together at the boundary coefficients to form the full band.

Training

Figure 7:
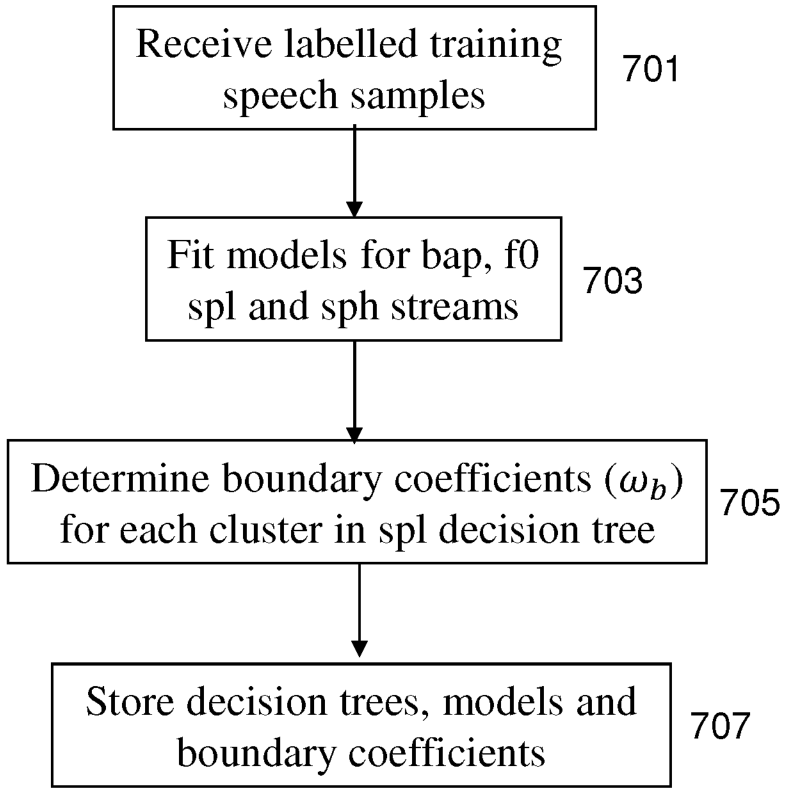
FIG. 7 shows a method of training a text to speech system according to an embodiment.

FIG. 7 shows a method of training a text to speech system according to an embodiment. This method may be implemented by the system 1 of FIG. 1, or may be implemented by a separate device to generate the models before the models are stored onto the system 1.

Initially, labelled training speech samples are received 701. For each stream models are fitted 703 to the training data. Such streams include the band aperiodicity stream (bap), the fundamental frequency stream (f0), the high frequency spectral stream (sph) and the low frequency spectral stream (spl).

As discussed above, the high and low frequency streams are modelled with an overlapping range (see FIG. 6). If boundary coefficients are being determined in advance for each specific state, then the boundary coefficients for each cluster in the low frequency stream are determined 705 (see FIG. 7). The decision trees, models and boundary coefficients are then stored for use in synthesising speech 707.

If the boundary coefficients are determined using the second embodiment described above, then the boundary coefficients need not be stored and may instead be derived during synthesis. Accordingly, training the system may comprise only steps 701 and 703 before the decision trees and models are stored. The boundary coefficients can then be determined during synthesis for each frame being generated. Naturally, in this case the spl and sph streams will overlap.

Speech Synthesis

Figure 8:
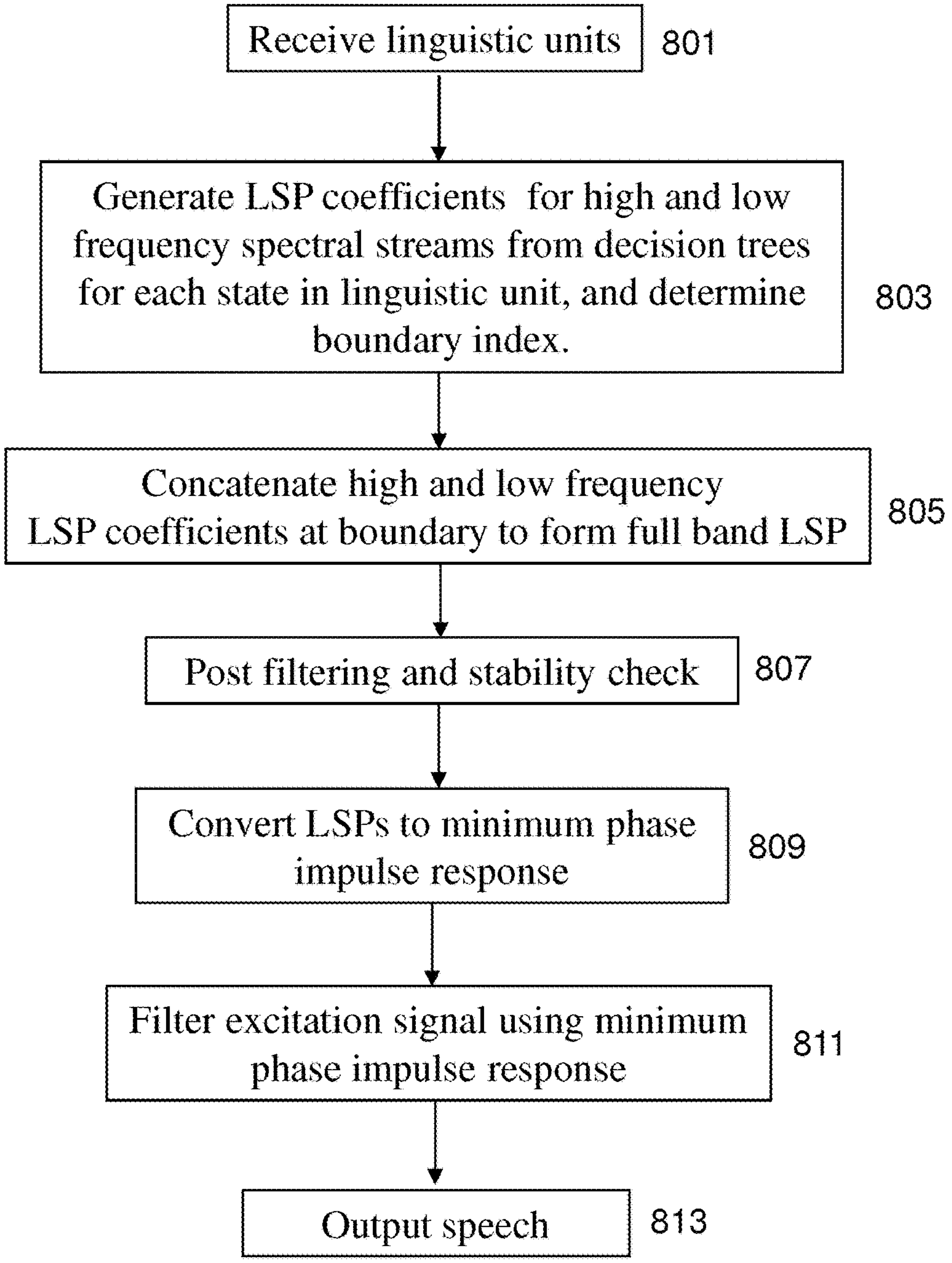
FIG. 8 shows a method of synthesising speech according to an embodiment.

FIG. 8 shows a method of synthesising speech according to an embodiment. This method may be implemented by the system 1 of FIG. 1.

Initially, a set of linguistic units are received 801. The linguistic units may be phonemes, sub-phonemes or any other segment of language. Context can be derived from the linguistic units, for instance, each linguistic unit may be considered in the context of one or more linguistic units that come before and after it. Alternatively, the received linguistic units may already comprise context labelling.

For each linguistic unit, the HMMs are extracted from pretrained decision trees based on the context of the linguistic unit. This involves, for each decision tree (i.e. for each stream), determining the cluster (leaf node) into which the linguistic unit falls. Each linguistic unit (or its states) is thus converted to a set of LSP coefficients for the high and low frequency streams 803. For each linguistic unit the index of the boundary coefficient is extracted from the decision tree for the low frequency spectral stream. In an alternative embodiment, the boundary index is predefined and is the same for all linguistic units (as discussed above).

The high and low frequency LSP coefficients are then concatenated at the boundary coefficient to form a full band LSP 805. In one embodiment, all LSP coefficients with indices less than or equal to the boundary coefficient are taken from the low frequency spectral stream and the remaining LSP coefficients are taken form the high frequency spectral stream. This provides more information from the low frequency spectral stream which provides a greater amount of linguistic information.

In an alternative embodiment, all LSP coefficients with indices less than the index of the boundary coefficient are taken from the low frequency spectral stream and all LSP coefficients with indices greater than and equal to the index of the boundary coefficient are taken from the high frequency spectral stream.

In the present embodiment post filtering is then applied to the full band LSP coefficients 807, however, this is optional. Also, optionally, the LSP coefficients may be checked for stability and the orders of the LSP coefficients are rearranged if necessary. In another embodiment, post-filtering may be applied to the low frequency spectrum only, or not at all.

The LSP coefficients are then converted to a minimum phase impulse response 809 which is used to filer an excitation signal generated from the band aperiodicity and fundamental frequency streams 811. The band aperiodicity and fundamental frequency streams are generated using methods known in the art and shall therefore not be described further. The excitation signal is convolved with the minimum phase impulse response to generate a synthesised speech waveform. This speech waveform is then output 813. Alternative methods exist for converting the generated LSP coefficients with excitation parameters and are equally applicable to the present invention.

Synthesised Speech

Figure 9:
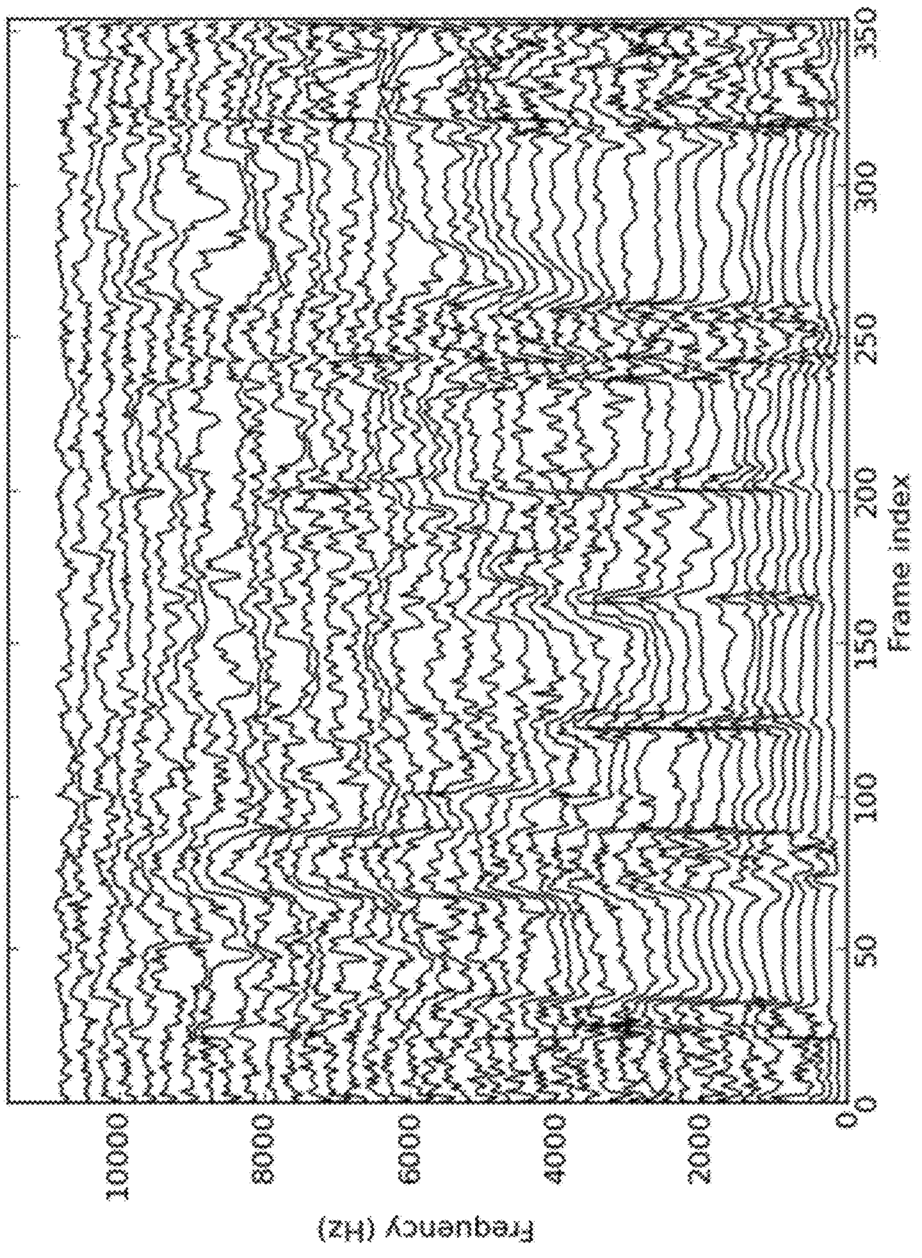
FIG. 9 shows the natural, unsynthesised LSP trajectories for an utterance in a test set.
Figure 10:
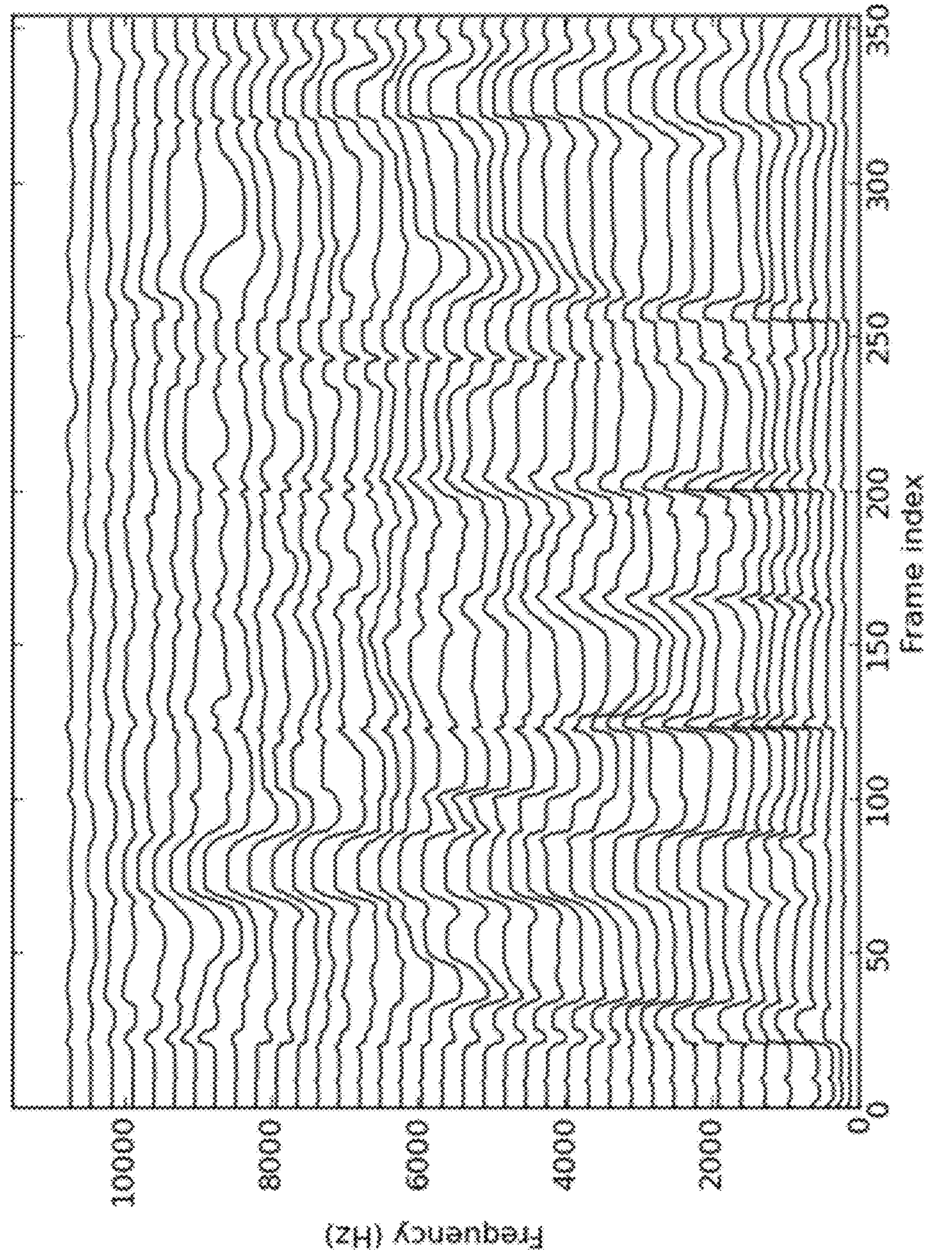
FIG. 10 shows the LSP trajectories of the utterance synthesised with a HMM which comprises a single spectral stream.
Figure 11:
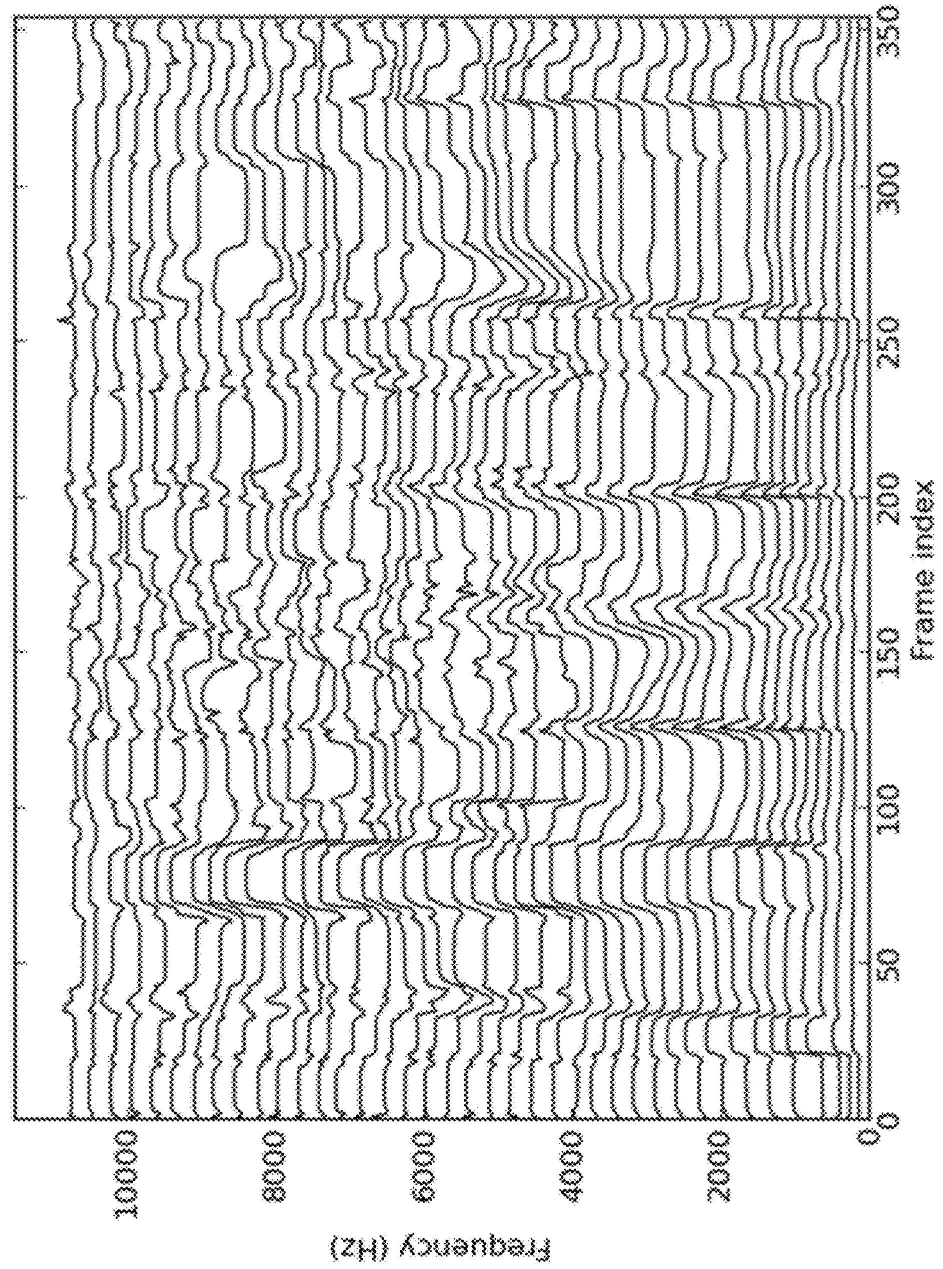
FIG. 11 shows the LSP trajectories of the utterance synthesised with a multi-spectral stream HMM according to an embodiment.

FIGS. 9-11 show the LSP trajectories for an utterance in a test set. FIG. 9 shows the natural, unsynthesised trajectories. FIG. 10 shows the trajectories synthesised with a HMM which comprises a single spectral stream. FIG. 11 shows the trajectories synthesised with a multi-spectral stream HMM according to an embodiment.

Finer details can be observed in the natural trajectories (FIG. 9). The trajectories are more smoothed out in the HMM generated parameters, thereby showing the smoothing effect caused by the statistical modelling (FIG. 10) Having said this, the trajectories generated using separate high and low spectral streams (FIG. 11) show an increased degree of fluctuation in the higher order LSPs (above the boundary of 4 kHz). This leads to more natural sounding speech as the features of the individual speaker being modelled are more accurately represented.

Whilst the above embodiments split the spectral stream into two streams, it will be appreciated that the spectrum may be split into more streams. This will allow even greater flexibility for the modelling of the spectrum, allowing further frequency ranges to be modelled separately based on their respective characteristics. Splitting into a greater number of streams can be achieved via the same methods as described above (e.g. specific sets of boundary coefficients may be determined for each split). Each spectral band above the lowest spectral band may be modelled more and more tightly to the training data. The lowest (or lower) spectral bands may be modelled via deep neural networks whilst the upper spectral band(s) may be modelled using HMMs and increasingly larger decision trees.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A speech synthesis method in a speech synthesiser, the speech synthesis method comprising:

receiving one or more linguistic units;

modelling higher and lower spectral frequencies of speech data as separate high frequency spectral and low frequency spectral streams by applying a first set of one or more statistical models to the higher spectral frequencies and a second set of one or more statistical models to the lower spectral frequencies to convert said one or more linguistic units into a sequence of speech vectors for synthesising speech; and outputting the sequence of speech vectors, wherein:

the high frequency spectral stream is modelled using a first set of one or more decision trees, and the low frequency spectral stream is modelled using either (1) a second set of one or more decision trees, the first set of one or more decision trees being larger than the second set of one or more decision trees, or (2) a deep neural network.

2. The speech synthesis method of claim 1, wherein converting said one or more linguistic units into the sequence of speech vectors comprises, for each of the one or more linguistic units:

assigning a number of states for the linguistic unit;

for each state in the linguistic unit:

generating one or more line spectral pairs for each of the high frequency spectral and low frequency spectral streams; and concatenating the line spectral pairs for the high frequency spectral and low frequency spectral streams at a boundary to form a combined spectrum; and generating speech vectors using the combined spectra for the states.

3. The speech synthesis method of claim 2, wherein the same boundary is applied to each linguistic unit, or each state of each linguistic unit is assigned its own specific boundary, or each state comprises a number of frames and each frame within each state is assigned its own specific boundary.

4. The speech synthesis method of claim 2, wherein the high frequency spectral and low frequency spectral streams overlap for all states across an overlapping range of line spectral pair indices, and either:

each state of each linguistic unit is assigned its own specific boundary, and a boundary line spectral pair index is defined for each state to set the boundary for that state, wherein defining the boundary line spectral pair index for each state comprises determining the corresponding frequency for each line spectral pair in the low frequency spectral stream for that state, and determining the boundary line spectral pair index based on an assessment of the frequencies of the line spectral pairs for the state relative to a predefined threshold frequency, or each state of each linguistic unit comprises a number of frames, wherein each frame unit is assigned its own specific boundary, and a boundary line spectral pair index is defined for each frame to set the boundary for that frame, wherein defining the boundary line spectral pair index for each frame comprises determining the corresponding frequency for each line spectral pair in the low frequency spectral stream for that frame, and determining the boundary line spectral pair index based on an assessment of the frequencies of the line spectral pairs for the frame relative to a predefined threshold frequency.

5. A method of training a speech synthesiser to convert a sequence of linguistic units into a sequence of speech vectors by use of a training system comprising a controller, the method comprising:

receiving speech data and associated linguistic units;

fitting a first set of one or more statistical models to higher spectral frequencies of speech data to form a high frequency spectral stream and fitting a second set of one or more statistical models to lower spectral frequencies of the speech data to form a separate low frequency spectral stream, to fit a set of the models to the speech data and associated linguistic units; and outputting the set of models, wherein:

the high frequency spectral stream is modelled using a first set of one or more decision trees, and the low frequency spectral stream is modelled using either (1) a second set of one or more decision trees, the first set of one or more decision trees being larger than the second set of one or more decision trees, or (2) a deep neural network.

6. The method of claim 5, wherein each linguistic unit comprises a number of states, and the first and second sets of one or more statistical models are configured to produce, for each state, first and second sets of line spectral pairs respectively, wherein the first and second sets of line spectral pairs may be concatenated to form a combined spectrum for the state.

7. The method of claim 6, further comprising: defining a boundary line spectral pair that sets the boundary between the high frequency spectral and low frequency spectral streams, and wherein a same boundary line spectral pair index is applied to each state being modelled, or each state of each linguistic unit is assigned its own specific boundary, or each state comprises a number of frames and each frame within each state is assigned its own specific boundary.

8. The method of claim 7, wherein the same boundary line spectral pair index is applied to each state being modelled, and wherein defining the boundary line spectral pair index comprises:

determining the frequencies of the line spectral pairs for each state of the received speech data, and defining the boundary line spectral pair index based on the median frequency of each of the line spectral pairs across all states relative to a predefined threshold frequency.

9. The method of claim 7, wherein the low frequency spectral stream is modelled using the second set of one or more decision trees, each state of each linguistic unit is assigned its own specific boundary, and the high frequency spectral and low frequency spectral streams are defined to overlap for all states across an overlapping range of line spectral pair indices, wherein the overlapping range is defined as the line spectral pair indices which have at least one state from the received speech data for which the respective line spectral pair index has a frequency that falls within a predefined range of frequencies.

10. The method of claim 9, wherein defining the boundary line spectral pair index for each state comprises, for each leaf node in each decision tree for the low frequency spectral stream:

determining the median frequency for each line spectral pair index across all of the states of the received speech data in the leaf node; and determining the boundary line spectral pair index for the states in the leaf node based on the median frequency of each line spectral pair index relative to a predefined threshold frequency.

11. A non-transitory storage medium comprising computer readable code configured to cause a computer to perform the method of claim 1.

12. A speech synthesiser comprising: a processor configured to:

receive one or more linguistic units;

model higher and lower spectral frequencies of speech data as separate high frequency spectral and low frequency spectral streams by applying a first set of one or more statistical models to the higher spectral frequencies and a second set of one or more statistical models to the lower spectral frequencies to convert said one or more linguistic units into a sequence of speech vectors for synthesising speech; and output the sequence of speech vectors, wherein:

the high frequency spectral stream is modelled using a first set of one or more decision trees, and the low frequency spectral stream is modelled using either (1) a second set of one or more decision trees, the first set of one or more decision trees being larger than the second set of one or more decision trees, or (2) a deep neural network.

13. A training system for a speech synthesiser configured to convert a sequence of linguistic units into a sequence of speech vectors, the training system comprising: a controller configured to:

receive speech data and associated linguistic units;

fit a first set of one or more statistical models to higher spectral frequencies of the speech data to form a high frequency spectral stream and fit a second set of one or more statistical models to lower spectral frequencies of the speech data to form a separate low frequency spectral stream to fit a set of the models to the speech data and associated linguistic units; and output the set of models, wherein:

the high frequency spectral stream is modelled using a first set of one or more decision trees, and the low frequency spectral stream is modelled using either (1) a second set of one or more decision trees, the first set of one or more decision trees being larger than the second set of one or more decision trees, or (2) a deep neural network.

14. A non-transitory storage medium comprising computer readable code configured to cause a computer to perform the method of claim 5.

* * * * *